No. 787,758. Patented April 18, 1905.

UNITED STATES PATENT OFFICE.

HENRI LOUIS HERRENSCHMIDT, OF LE GENEST, FRANCE.

PROCESS OF TREATING PRODUCTS CONTAINING VANADIUM, MOLYBDENUM, TITANIUM, AND TUNGSTEN.

SPECIFICATION forming part of Letters Patent No. 787,758, dated April 18, 1905.

Application filed August 13, 1903. Serial No. 169,378.

*To all whom it may concern:*

Be it known that I, HENRI LOUIS HERRENSCHMIDT, metallurgical engineer, of Le Genest, Mayenne, Republic of France, have invented a Process for the Treatment of Ores or Products Containing Vanadium, Molybdenum, Titanium, or Tungsten, of which the following is a full, clear, and exact description.

This invention relates to a process of treating ores or products containing vanadium for the purpose of obtaining vanadic acid or the vanadate of any metal, as well as alloys of vanadium with certain metals—such as nickel, iron, copper, &c.—in definite proportions. The process is also equally applicable for the treatment of ores or products containing molybdenum, titanium, or tungsten.

The process which is hereinafter described as applied to the treatment of ores or products containing vanadium is characterized, essentially, by the following operations: first, the refining of a vanadate-of-soda liquor obtained by treating the vanadium ore or product with a soda salt, either by evaporation and crystallization or by the addition of vanadic acid, (which latter may result from a fractional precipitation obtained by the addition of vanadium sulfate, which may be impure,) or of an acid or of a metallic salt; second, the precipitation of the vanadium contained in this purified liquor, either by means of the sulfate, chlorid, or other soluble salt of a metal—such as iron, nickel, copper, &c.—with the object of obtaining the vanadate of said metal, (vanadate of iron, of nickel, of copper, &c.,) or by the action of concentrated sulfuric acid upon the liquor previously concentrated to a syrupy condition, with the object of obtaining vanadic acid; third, the reduction of oxygenated compounds of vanadium, which consists in reducing the vanadate of nickel, iron, copper, &c., by carbon, tar, or other reducing agent with the object of obtaining the alloy desired.

In order that the invention may be more readily understood, I will proceed to describe the application of the process to the treatment of a vanadiferous lead ore of about the following composition, viz: lead, iron, vanadium, silica, alumina, and copper.

The ore is fused with an alkaline carbonate, (carbonate of soda, for example,) as a flux and fuel. Metallic lead then forms a cupreous matte, if the ore contains copper, and a slag chiefly composed of vanadate of soda and containing silica, alumina, and iron. This slag is then either ground and washed or run direct into the water, preferably at a boiling temperature, to facilitate disintegration. The major part of the vanadium contained in the slag then dissolves, forming impure vanadate of soda, the insoluble residue containing iron, alumina, silica, and a little vanadium, the lead being run into pigs as well as the cupreous matte. The solution of vanadate of soda thus obtained contains impurities, such as silicate of soda and aluminate of soda, and in order to free it from these impurities it is evaporated and crystallized, the impurities remaining in the mother-liquors, or vanadic acid may be added to the liquor, causing the precipitation of the silica and alumina. Instead of directly employing vanadic acid I may add vanadate of soda or sulfate or chlorid of vanadium to the liquor, or a fractional precipitation may be effected by means of a metallic salt or by the addition of an acid to the liquor, in this latter case previously concentrated.

The vanadium contained in the solution of vanadate of soda purified in the manner described is precipitated either by means of sulfuric acid, if it be desired to obtain vanadic acid, or by a soluble salt of the metals from which a vanadate is to be obtained.

In treating vanadate of soda with sulfuric acid to obtain vanadic acid care should be taken to previously concentrate the vanadate-of-soda liquor to a syrupy consistency. If it be desired to obtain an alloy—say, for example, vanadium-nickel—the vanadium contained in the alkaline vanadate is precipitated by a soluble salt of nickel—sulfate of nickel, for example—this operation being preferably performed in the cold, in which case it will be complete. The precipitate of vanadium and nickel is then washed, dried, and calcined, the product constituting a material suited for making vanadium-nickel either in the electric furnace or by alumino-thermy, or, preferably, by a special reduction process, hereinafter described, which constitutes one of the characteristic features of the present process. If instead of vanadium-nickel it be desired to obtain a mixture of iron and vanadium, copper and vanadium, &c., the operation would be conducted on precisely-similar lines. The oxids of vanadium and nickel (iron or copper, &c.) thus obtained are reduced by a method which may be termed "reduction by influence," which consists in mixing the oxids of vanadium and nickel (iron, copper, &c.) with a reducing agent—such as carbon, tar, &c.—the mixture being subsequently agglomerated and heated.

Oxid of vanadium by itself is incapable of being reduced to pure metallic vanadium; but when it is in the presence of the oxid of another metal the reduction of the latter metal brings about that of the vanadium. There is thus formed a carburized vanadium-nickel, which may be decarburized by any known process.

An alloy of nickel (iron, copper) and vanadium may also be obtained by intimately mixing oxid of nickel (iron, copper) with vanadic acid and reducing the mixture, as hereinbefore described, by the addition of a reducing agent, such as carbon, tar, &c.

It has been before stated that at an early stage of the process a slag was obtained containing an insoluble product composed of silica, iron, alumina, and a little vanadium. This insoluble product if treated with concentrated sulfuric acid yields a solution containing sulfate of vanadium, sulfate of alumina, sulfate of iron, while the greater part of the silica and alumina remains insoluble. This liquor is treated with soda to form impure vanadate of soda, which is treated in the same manner as the vanadate-of-soda liquor resulting from the dissolution of the slag obtained at an early stage of the process, or it is employed for effecting the fractional precipitation intended for purifying the impure vanadate of soda, as before described.

In the case of ores such as Colorado sandstones the ore in a finely-crushed condition is first attacked either with soda or with sulfuric acid. The liquor obtained, containing either impure vanadate of soda or impure sulfate of vanadium, is treated in the manner hereinbefore described.

As before stated, the present process may be applied to the treatment of ores and products containing molybdenum, titanium, or tungsten, and also by means of this process two or more of these metals—vanadium, molybdenum, titanium, or tungsten—may be alloyed with another metal, such as nickel, iron, or copper.

I claim—

1. A process of treating ores or products containing vanadium for the purpose of obtaining vanadic acid, the same being characterized by the following operations, to wit: (a) the refining of a vanadate-of-soda liquor by evaporation and crystallization; (b) the precipitation of the vanadium contained in the purified liquor by the action of concentrated sulfuric acid upon said liquor, previously concentrated to a syrupy condition; and (c) the process of reduction by a reducing agent.

2. The herein-described process of treating ores containing vanadium, which consists in reducing the ore to a solution, refining the same and precipitating the vanadium contained in the liquid, and then reducing the vanadium salts or compound to an alloy.

3. The herein-described process of treating ores containing vanadium, which consists in reducing the ore to a solution, refining such solution, concentrating the same to a syrupy state, and precipitating the vanadium by means of a soluble salt or an acid, and then reducing the vanadium salts or compound to an alloy.

The foregoing specification of my process for the treatment of ores or products containing vanadium, molybdenum, titanium, or tungsten signed by me this 27th day of July, 1903.

HENRI LOUIS HERRENSCHMIDT.

Witnesses:
AUGUSTUS E. INGRAM,
MAURICE H. PIGNET.